(12) United States Patent
Witham et al.

(10) Patent No.: US 10,858,570 B2
(45) Date of Patent: Dec. 8, 2020

(54) AQUEOUS CEMENT COMPOSITIONS INCORPORATING PARTICLES THAT ARE ACTIVATED TO CONTROL RHEOLOGY WHEN WATER SOLUBLE PORTIONS OF THE PARTICLES ARE RELEASED IN THE PRESENCE OF WATER

(71) Applicant: Dow Global Technologies LLC, Midland, MI (US)

(72) Inventors: Cole Witham, Pearland, TX (US); Roger Kuhlman, Lake Jackson, TX (US); Michael Poindexter, Sugar Land, TX (US); Jorg Theuerkauf, Midland, MI (US); Michael Radler, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 320 days.

(21) Appl. No.: 14/415,220

(22) PCT Filed: Jul. 13, 2013

(86) PCT No.: PCT/US2013/050806
§ 371 (c)(1),
(2) Date: Jan. 16, 2015

(87) PCT Pub. No.: WO2014/014983
PCT Pub. Date: Jan. 23, 2014

(65) Prior Publication Data
US 2015/0184059 A1    Jul. 2, 2015

Related U.S. Application Data

(60) Provisional application No. 61/672,537, filed on Jul. 17, 2012.

(51) Int. Cl.
*C09K 8/46* (2006.01)
*C04B 18/22* (2006.01)
(Continued)

(52) U.S. Cl.
CPC .............. *C09K 8/46* (2013.01); *C04B 18/022* (2013.01); *C04B 40/0633* (2013.01); *C09K 8/487* (2013.01); *E21B 33/138* (2013.01)

(58) Field of Classification Search
CPC ... C04B 28/02; C04B 40/0039; C04B 24/383; C04B 2103/12; C04B 2103/46;
(Continued)

(56) References Cited

U.S. PATENT DOCUMENTS 4,569,395 A    2/1986  Carpenter
4,892,589 A *  1/1990  Kirkland .................. C09K 8/46
                                                106/172.1

(Continued)

FOREIGN PATENT DOCUMENTS

EP    2 412 690    2/2012
EP    1 333 152    5/2012
(Continued)

OTHER PUBLICATIONS

Whistler, Advances in Chemistry ACS, Washington, DC 1973.*
(Continued)

*Primary Examiner* — William D Hutton, Jr.
*Assistant Examiner* — Charles R Nold

(57) ABSTRACT

The present invention provides strategies for improved control of fluid loss, hydration, settling, and separation of aqueous cementing compositions over a wide temperature and time range. The present invention is based at least in part upon water-effusing particles used as additives for the compositions, wherein the particles are activated to control (Continued)

rheology when water soluble portions of the particles are released in the presence of water.

1 Claim, 4 Drawing Sheets

(51) Int. Cl.
| | |
|---|---|
| C04B 28/02 | (2006.01) |
| C04B 18/28 | (2006.01) |
| C04B 40/06 | (2006.01) |
| C04B 18/02 | (2006.01) |
| C09K 8/487 | (2006.01) |
| E21B 33/138 | (2006.01) |

(58) Field of Classification Search
CPC .............. C04B 20/008; C04B 2103/30; C04B 2103/40; C04B 22/002; C04B 2103/302; C09K 8/487; C09K 8/467; C08L 29/04; C08L 1/284; C08L 1/30
See application file for complete search history.

(56) References Cited

U.S. PATENT DOCUMENTS

| | | | |
|---|---|---|---|
| 4,997,487 | A | 3/1991 | Vinson et al. |
| 5,184,680 | A | 2/1993 | Totten et al. |
| 5,779,787 | A | 7/1998 | Brothers et al. |
| 6,372,901 | B1 | 4/2002 | Partain, III et al. |
| 6,610,140 | B2 | 8/2003 | Vijn et al. |
| 6,739,806 | B1 * | 5/2004 | Szymanski ............ C04B 28/02 106/694 |
| 7,409,990 | B1 | 8/2008 | Burts, Jr. et al. |
| 7,422,061 | B2 | 9/2008 | Jones et al. |
| 7,815,731 | B2 | 10/2010 | Beckman |
| 7,947,627 | B2 * | 5/2011 | Hoefer .................. C09K 8/516 166/282 |
| 2004/0206502 | A1 * | 10/2004 | Reddy ..................... C04B 28/06 166/293 |
| 2005/0178546 | A1 | 8/2005 | Reddy et al. |
| 2006/0189487 | A1 * | 8/2006 | Szymanski ......... C04B 24/2623 507/230 |
| 2006/0199742 | A1 * | 9/2006 | Arisz ..................... A61K 8/731 507/114 |
| 2007/0022916 | A1 | 2/2007 | Raki et al. |
| 2007/0056731 | A1 * | 3/2007 | Alsobrook ............. C09K 8/032 166/292 |
| 2007/0135312 | A1 * | 6/2007 | Melbouci ............... C09K 8/035 507/214 |
| 2007/0266906 | A1 * | 11/2007 | Garcia ................ C04B 22/0026 106/817 |
| 2007/0284104 | A1 * | 12/2007 | Beckman ............ C04B 24/2623 166/293 |
| 2007/0284105 | A1 | 12/2007 | Beckman |
| 2008/0142220 | A1 | 6/2008 | Hoefer et al. |
| 2011/0272142 | A1 | 11/2011 | Lewis et al. |

FOREIGN PATENT DOCUMENTS

| | | |
|---|---|---|
| GB | 2 445 086 | 6/2008 |
| WO | WO 00/5276 | 2/2000 |
| WO | WO 01/34939 | 5/2001 |
| WO | WO 03/068880 | 8/2003 |
| WO | WO 2009/152989 | 12/2009 |
| WO | WO 2010/144365 | 12/2010 |
| WO | WO 2011/046679 | 4/2011 |
| WO | WO 2012/015400 | 2/2012 |
| WO | WO 2012/015534 | 2/2012 |

OTHER PUBLICATIONS

Maitra et al. "Crosslinking in hydro-gels, A Review", American Journal of Polymer Science; 2014, 4(2):25-31, six pages.*

Khayat, "Viscosity-Enhancing Admixtures for Cement-Bases Materials—An Overview" Cement and Concrete Compositions, 20 (1998) 171-188.

Chow et al., "The Rheological Proprieties of Cement Slurries: Effects of Vibration Hydration Conditions, and Additives" SPE Production Engineering, (1988) 543-550.

Witt, W., Kohler, U., List, J., "Direct Imaging of Very Fast Particles Opens the Application of Powerful (dry) Dispersion for Size and Shape Characterization" PARTEC 2004, pp. 1-4, Nuremberg, Germany.

P. W. Morgan, "Determination of Ethers and Esters of Ethylene Glycol A Modified Alkoxyl Analysis" Ind. Eng. Chem., Anal. Ed., 18, 500-504 (1946).

Kastornyih, L.I., (2007) Dobavki v Betonyi i stroitelnie rastvoyi, Rostov-na-Donu, Feniks, p. 29, machine translation.

* cited by examiner

AQUEOUS CEMENT COMPOSITIONS INCORPORATING PARTICLES THAT ARE ACTIVATED TO CONTROL RHEOLOGY WHEN WATER SOLUBLE PORTIONS OF THE PARTICLES ARE RELEASED IN THE PRESENCE OF WATER

The present application claim priority to International Application No. PCT/US2013/050806, filed Jul. 17, 2013, which in turns claims priority under 35 USC § 119(e) from U.S. Provisional Patent Application having Ser. No. 61/672,537, filed Jul. 17, 2012, entitled "AQUEOUS CEMENT COMPOSITIONS INCORPORATED PARTICLES THAT ARE ACTIVATED TO CONTROL RHEOLOGY WHEN WATER SOLUBLE PORTIONS OF THE PARTICLES ARE RELEASED IN THE PRESENCE OF WATER," wherein the disclosures of these applications are incorporated herein by reference in their respective entireties for all purpose.

FIELD OF THE INVENTION

The present invention relates to formulating aqueous cementing compositions with fluid loss additives. More specifically, the present invention relates to formulating aqueous cementing compositions with fluid loss or anti-settling additives in the form of particles comprising one or more water soluble polymers whose functionality is masked until water soluble portions of the particles are released in the presence of water responsive to time and temperature triggers. The compositions are useful for making reinforcing structures in oil, gas, geothermal and water wells.

BACKGROUND OF THE INVENTION

Well cementing is used to reinforce well structures in oil, gas, geothermal and water wells. Well cementing involves preparing a slurry of hydraulic cement(s), water, and optionally other ingredients, which is then pumped to a desired deployment site. For example, the composition may be pumped to the annular cavity between a well casing and surrounding geographic formations or in the open hole below the casing string. Goals of cementing include to prevent corrosion, to provide structural reinforcement and otherwise protect the well structures, and to provide zonal isolation.

Water is a key ingredient of the cement slurry. Water must be present for the cement to set and cure properly. This means that the water-to-cement ratio needs to be substantially maintained during cement delivery, setting, and curing. However, particularly at higher temperatures, water undesirably can separate or otherwise be lost from the slurry. Filtrate loss is a common problem when water is lost from the slurry into surrounding, porous, lower pressure earth formations. Additionally, without proper rheology, slurry components also can separate, with heavier ingredients settling under gravity. This also results in poor setting and curing.

To mitigate fluid loss and provide more favorable rheology, fluid loss additives are included in aqueous cementing compositions. Fluid loss additives also can protect the cement slurry against settling and separation. Unfortunately, there are few fluid loss additives that function effectively above 190° F. and even fewer that function effectively above 250° F. Yet cementing compositions used in well applications often see higher temperatures in these ranges. Another problem is that some fluid loss additives are only effective at higher temperatures when the additives are loaded in larger quantities. This is problematic, as excess amounts of additives can cause excessive, early viscosity build and also result in higher treatment costs. This makes it difficult to pump the thick compositions to remote well locations. Another problem is that many additives are active as soon as being formulated into cementing compositions. Yet, in many applications, it would be better if the additives were not functional until after the compositions are pumped to the desired deployment site. Yet, due to the remote location of typical well deployment sites, it is not practical to add the additives after deployment.

Thus, there remains a strong need for fluid loss additives with high temperature functionality and whose functionality can be controllably delayed.

SUMMARY OF THE INVENTION

The present invention provides strategies for improved control of fluid loss, hydration, settling, and separation of aqueous cementing compositions over a wide temperature range. The present invention is based at least in part upon water-effusing, modified particles used as additives for the compositions. Water-effusing means that the particles comprise at least one water soluble, polymer in a manner such that the particles effuse in the presence of water to release water-thickening, water soluble portions of the particles. In many embodiments, the effused portions comprise at least one of the water soluble polymer(s) included in the water-effusing particles. Thus, the particles are activated to control rheology when water soluble portions of the particles are released in the presence of water. Generally, the rate of release of the effused portions increases with increasing temperature. From a practical perspective, the rheology modifying characteristics of the particles is delayed, but is increasingly realized as effusion progresses.

Forming the water soluble polymer initially into particle masses that effusably dissolve into aqueous media provides significant performance advantages. Firstly, the rheology-modifying functions of the water soluble polymer are masked at least to some degree in the particle form as supplied. Thus, the additive initially has minimal impact upon mixing and deploying the cementitious compositions to desired deployment sites. This allows the compositions to be pumped to remote well locations very easily. Then, responsive to time delay and temperature, water soluble portions of the particles are released from the particles into the surrounding slurry where the functionality of the water soluble portions for thickening the aqueous media is rapidly activated. In particular, activation results in rapid viscosity build as well as providing protection against fluid loss, ingredient separation, and sagging.

The activated particles also may significantly delay hydration of the cementing composition, extending the working time. The particles function over a wide range of temperatures including higher temperatures e.g., 250° F. or greater.

Significantly, activation of the additive functions via release of the constituent water soluble polymer is a strong function of particle size of the particles. This means that particle size ranges can be selected to obtain desired time and temperature triggers for effusion and corresponding dissolution of the effused particle portions. Thus, desired effusion, dissolution, and corresponding activation profiles are easy to tailor via selection of particles of appropriate size(s). Combinations of particle sizes can be used so that activation can occur at multiple or sequential times and temperatures. Thus, different sized particles can be used to independently optimize viscosity and high temperature performance. It is also believed that the particles could protect cement slurries from gas migration.

In one aspect, the present invention relates to a method of making an aqueous cementing composition, comprising the steps of
  (a) providing water-effusing particles, said water-effusing particles comprising at least one water soluble polymer in a manner such that the particles effuse in the presence of water to release water-thickening, water soluble portions of the particles, said portions comprising the at least one water soluble polymer; and
  (b) causing the particles to be incorporated into an aqueous cementing composition comprising the particles, an inorganic, hydraulic cement, a dispersant, and an aqueous liquid carrier.

In another aspect, the present invention relates to a method of making an oil well structure, comprising the steps of:
  (a) providing an aqueous cementing composition, comprising an inorganic hydraulic cement, a plurality of particles, and an aqueous liquid carrier, wherein the particles comprise at least one water soluble polymer in a manner such that the particles effuse in the presence of water to release water-thickening, water soluble portions of the particles, said portions comprising the at least one water soluble polymer;
  (b) causing the aqueous cementing composition to be deployed to a well structure location in a manner such that the composition hardens and cures at the location, thereby forming a portion of the well structure.

In another aspect, the present invention relates to an aqueous cementing composition, comprising;
  (a) an aqueous liquid carrier;
  (b) an inorganic, hydraulic cement in admixture with the liquid carrier; and
  (c) a plurality of particles dispersed in the composition, said particles comprising at least one water soluble polymer in a manner such that the particles effuse in the presence of water to release water-thickening, water soluble portions of the particles, said portions comprising the at least one water soluble polymer.

In another aspect, the present invention relates to a kit for a concrete additive; comprising:
  (a) a plurality of particles, said particles comprising at least one water soluble polymer in a manner such that the particles effuse in the presence of water to release water-thickening, water soluble portions of the particles, said portions comprising the at least one water soluble polymer; and
  (b) instructions that cause the particles to be incorporated into an aqueous cementing composition comprising the particles, an inorganic, hydraulic cement, a dispersant, and an aqueous liquid carrier.

DETAILED DESCRIPTION OF PRESENTLY PREFERRED EMBODIMENTS

Figure 1:
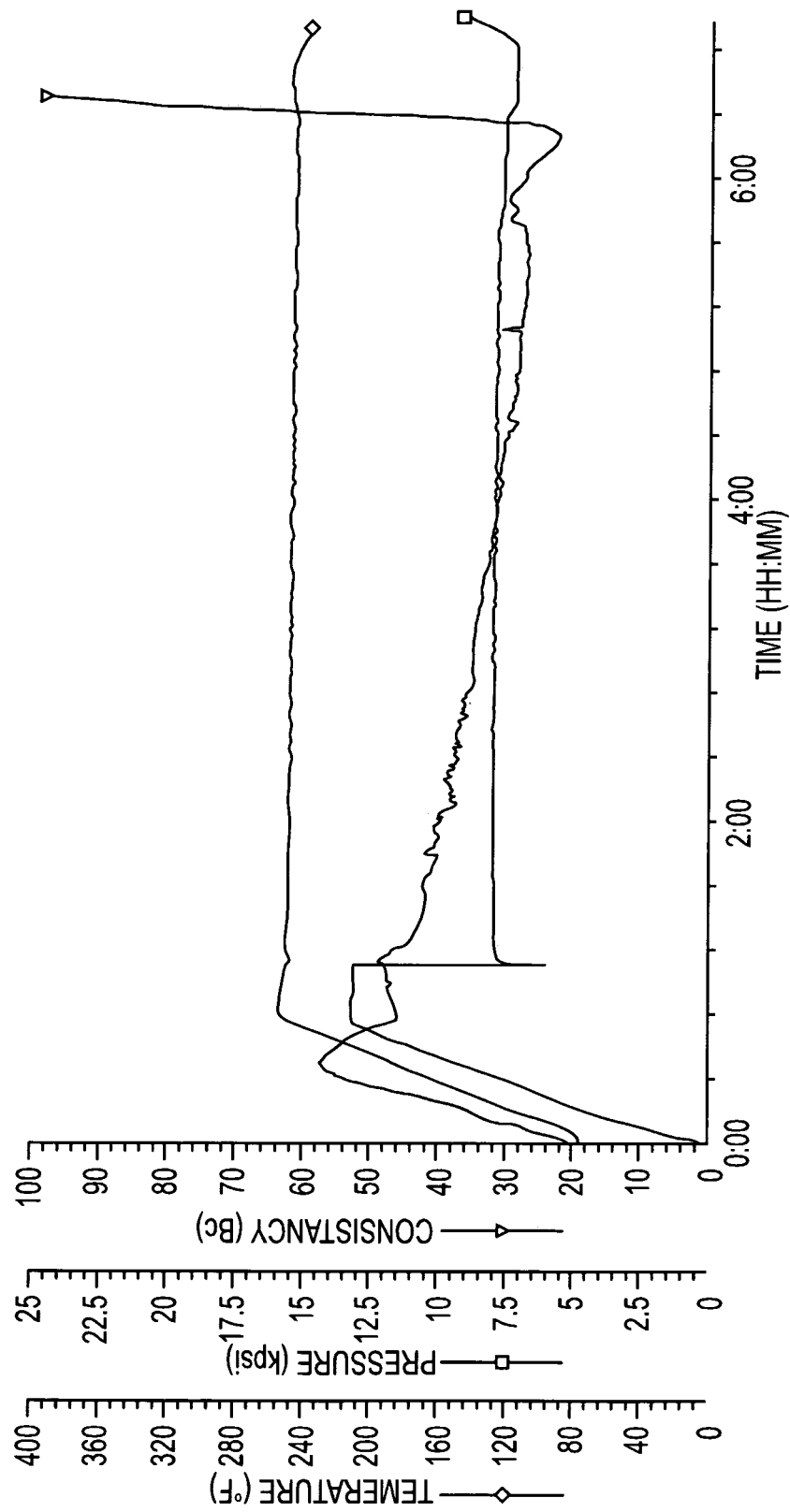
FIG. 1 is a thickening plot showing temperature, pressure, and consistency for Sample 4 as a function of time.

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Fluid loss, or like terminology, refers to any measure of water released or lost from a slurry over time. Fluid loss is measured at 250° F. in accordance with *Recommended Practice for Testing Well Cements*, API Recommended Practice 10B-2, $23^{rd}$ Edition (2002) and is expressed in mL/30 minutes. According to the invention, slurries are measured at a pressure of 1,000 pounds-force per square inch gauge (psig) and the indicated test temperature.

Free fluid, as used herein, refers to the aqueous phase that easily separates from a slurry under gravity separation over time. To test for free fluid see, *Recommended Practice for Testing Well Cements*, API Recommended Practice 10A, 23rd Edition (2002). Briefly, the cement slurry is prepared and conditioned to the test temperature. The slurry is then poured into a graduated cylinder which is placed in a water bath that is maintained at the test temperature. The free fluid is the amount of water, in volume percent, which separates after two hours. Free fluid is determined at 190° F.

Plastic viscosity (PV) as used in reference to the slurry, is calculated as the difference between the viscometer reading at 300 RPM ($\theta_{300}$) and the viscometer reading at 100 RPM ($\theta_{100}$) multiplied by 1.5. In other words, PV=Viscosity ($\theta_{300}-\theta_{100}$)×1.5. The plastic viscosity is measured at the reported test temperature with a rotational viscometer consistent with the practice and procedures outlined in API RP 13B-1.

Yield point (YP) relates to the flow resistance of the cement slurry. It is calculated from the plastic viscosity as follows: yield point (lb/100 ft$^2$)=$\theta_{300}$−plastic viscosity. The yield point is measured at the indicated test temperature with a rotational viscometer consistent with the practice and procedures outlined in API RP 13B-1. Values are determined at 80° F. and then after conditioning at 190° F. for 20 minutes.

By weight of cement (bwoc) refers to a weight percent of an additive, which may be liquid, solid, or gas, as added to a cement composition based on the cement ingredient(s) of the composition. For example, 2 parts weight of an additive which is added to 100 parts weight of cement and 40 parts by weight aqueous liquid carrier is present in an amount of 2% bwoc.

Aqueous cementing compositions of the present invention generally comprise an aqueous liquid carrier; at least one inorganic, hydraulic cement in admixture with the liquid carrier; and a plurality of particles dispersed in the composition, said particles comprising at least one water soluble polymer in a manner such that the particles effuse in the presence of water to release water-thickening, water soluble portions of the particles, said portions comprising the at least one water soluble polymer. In some representative embodiments, the particles comprise a reversible gel matrix derived at least in part from a water soluble polymer such as one or more hydrophobically modified, water soluble polysaccharides. As described below, such embodiments may be derived from a relatively fine powder comprising one or more water soluble polymers, but it is believed that the identity of the fine powder particles is not preserved when the powder is compounded to form a gel matrix. Schematically, the gel matrix is formed from constituent polymer particles and a controlled amount of diluent analogous to the way that bread flour and water form a dough. The resultant compounded mass may then be further processed such as by drying and grinding or dry grinding to form gel matrix particles of desired size(s).

The particles of gel matrix embodiments resist shedding of water soluble portions when dry. The particles further resist shedding or other effusion to some degree when incorporated into the aqueous compositions of the invention such that there is some delay in time before water soluble portions effuse from the matrices in the presence of the liquid carrier. Consequently, there is some delay before the water soluble portions making up the particles are released into the composition in a manner effective to more strongly influence the rheology of the compositions.

In other representative embodiments, the particles are in the form of granules or pellets that comprise reversibly agglomerated, water soluble polymer particles. Generally, it is believed that the identity of the individual powder particles is substantially maintained when the constituent powder particles effuse from the granules or pellets in the presence of an aqueous liquid carrier. The terminology "agglomerated" with respect to granule embodiments of the water-effusing particles means that the finer polymer particles are clustered into the larger granules in which the finer particles adhere to other particles in the granules by mechanical, physical, and/or chemical adhesion in a manner such that the particles resist separation when dry. The clusters further resist separation to some degree when incorporated into the aqueous compositions of the invention such that there is some delay in time before the finer particles effuse from the granules in the presence of the liquid carrier. Consequently, there is some delay before the finer polymer particles making up the granules are released into the composition in a manner effective to more strongly influence the rheology of the compositions.

The aqueous cementing compositions initially are in a fluid form that can be transported (e.g., by pumping, pouring, casting, etc.) and shaped. The compositions harden into a rock hard substance believed to occur at least in part by hydration of the hydraulic cement(s).

Inorganic hydraulic cement generally refers to one or more hydraulic cements that harden via a reaction mechanism believed to involve mineral hydration. Mineral hydration is an inorganic chemical reaction in which water is added to the crystal structure of a mineral, usually creating a new mineral, usually called a hydrate. The initial composition often is in the form of a fluid slurry. The hydrated, cured product is usually a hard solid. In many embodiments, the cured cement functions as a binder of other ingredients, such as aggregates and other additives, to form a cured concrete or mortar.

A variety of inorganic, hydraulic cements may be used singly or in combination in the practice of the present invention. Examples of inorganic, hydraulic cements include Portland cement, fly ash, slag cement, lime, gypsum, aluminosilicate materials, caustic calcined magnesia, pozzolan lime, supersulfated cement, calcium aluminate, calcium sulfoaluminate, metakaolin, combinations of these, and the like. Preferably, at least a portion of the hydraulic cement component contains Portland cement based hydraulic cement such as API types A through J.

The amount of hydraulic cement(s) incorporated into the aqueous cementing compositions of the present invention may vary over a wide range. Generally, many embodiments comprise from 40 weight percent to 95 weight percent of hydraulic cement(s) based on the total weight of the composition. Preferably hydraulic cement is present in an amount of from equal to or greater than 45 weight percent, more preferably equal to or greater than 50 weight percent, and even more preferably equal to or greater than 55 weight percent based on the weight of the cementing composition. Preferably the hydraulic cement is present in an amount of from equal to or less than 95 weight percent, preferably equal to or less than 90 weight percent, more preferably equal to or less than 85 weight percent, and even more preferably equal to or less than 80 weight percent based on the total weight of the cementing composition. For example, if the cementing composition is 40 weight percent hydraulic cement(s), it comprises 40 weight units of cement and 60 weight units of additional components including the liquid carrier.

The aqueous liquid carriers of the present invention generally include from 50 weight percent to 100 weight percent water based on the total weight of the liquid carrier. Preferred embodiments include at least 80 weight percent, more preferably at least 90 weight percent, even more preferably at least 95 weight percent of water based on the total weight of the liquid carrier. Exemplary co-solvents that may be used in combination with water include alcohols such as ethanol or isopropanol; polyethylene oxide glycols; glycol ethers; ketones such as methyl ethyl ketone or acetone; tetrahydrofuran; combinations of these, and/or the like. The choices of co-solvent(s), if any, are subject to factors such as flash point specifications relating to the intended uses of the compositions, Water from many sources may be used in the liquid carrier. The aqueous liquid carrier may incorporate one or more types of water generally encountered in drilling operations, e.g., fresh and tap water, distilled water, deionized water, natural and synthetic sea water, and natural and synthetic brine. The most commonly used source of water is fresh water from wells, rivers, lakes, or streams when drilling on land, and sea water when drilling in the ocean.

In many embodiments, the aqueous cementing compositions generally contain about 30 to 200 weight percent of the liquid carrier by weight of hydraulic cement (% bwoc). To exemplify, an aqueous cementing composition comprising 200% bwoc water would comprise 200 weight units of water and 100 weight units of hydraulic cement(s) for a total of 300 weight units. If this formulation additionally included 5% bwoc additives, the aqueous cementing solution would comprise 200 weight units of water, 100 weight units of cement, and 5 weight units of additives for a total of 305 weight units. In another example, an aqueous cementing composition comprising 40% bwoc water would comprise 40 weight units of water and 100 weight units of the cement for a total of 140 weight units.

In practice, the delayed activation of the particles of the present invention when incorporated into aqueous cementing compositions allows the compositions to maintain low viscosity for an extended period during which the compositions are formulated, mixed, and transported (such as via pumping) to the intended deployment site. Then, after some period of delay, the finer, water soluble constituents are released sufficiently from the particles to cause a generally sharp, rapid increase in the viscosity of the composition. When the additives are activated in this manner, this allows the compositions to resist settling, separation and water loss during the important curing stage.

The activation of the particles by effusion of finer, water soluble constituents is triggered by factors including the size of the particles, the time over which the particles are exposed to water, the temperatures of the composition and surrounding environment, the kind of water soluble polymer incorporated into the particles, and the like. This means that the particles have an initial particle morphology and initial masked functionality that transform in situ into the morphology and behaviors of the finer, water soluble portions as they become increasingly released. For instance, in some modes of practice, the particles initially might be relatively insoluble in the aqueous liquid carrier and initially have relatively minimal impact upon the characteristics of the cementing compositions such as viscosity, delaying hydration of the cement(s), water loss, settling, or the like. The particles do not significantly impact initial viscosity, for instance, so the slurry can be pumped, poured or otherwise deployed to the desired deployment site with much greater ease.

The particles release the fines at higher temps and/or after some lead time upon exposure to aqueous media. The released, water soluble, finer material has much more of an impact upon the characteristics described previously. In practical effect, the functionalities of the finer polymer material are masked at least to some degree in the particle form, but then are realized when the fines are released. The fine material is released from the particles with little if any effect on the activity of the fines once released. Once the finer polymer material is released from the particles to a sufficient degree, the impact on the composition is significant. Additionally, the fines improve fluid retention and increase viscosity to inhibit settling at high temperature. Thus, the additive is introduced as particles having a particular size range and with masked functionality, but the particles release the fine material to activate functionality and thereby quickly impart desired benefits once the fines are released.

Significantly, the release profile of the finer polymer material shed from the particles is a strong function of particle size range of the particles for a given type of water soluble polymer. Generally, with increasing particle size, fines are released after a longer delay period. Also, the rate of release tends to increase with increasing temperature. Conversely, smaller particles release fines at a faster rate, which increases with increasing temperature.

Advantageously, particles of one or more particle size(s) can be selected to tailor a desired dissolution profile. This means that particle size(s) can be used to tune and optimize viscosity and high temperature performance. A combination of two or more differently sized particle populations can be used so that the benefits of the fines are triggered at multiple times. From a practical perspective, the present invention provides strategies to add an active material (released fines) to a remote composition in situ from a source (particles having a particular size range) within the composition, but without having to actually physically add the material from a source outside the composition.

In one illustrative mode of practice, the particles of the present invention are made by compounding the fine, water soluble polymer powder into one or more larger masses using a liquid to facilitate compounding. Without wishing to be bound, it is believed that the mass resulting from compounding comprises one or more reversible gel matrices derived at least in part from the powder. Without wishing to be bound, it is believed that the identity of individual powder particles generally may not be preserved as a result of compounding. Compounding is analogous to the way that water is mixed with flour to form bread dough. The liquid optionally may incorporate binder functionality to help promote the compounding. Preferably, the compounded mass(es) are formed by first contacting the particles with a controlled amount of a liquid diluent such as water. A sufficient amount of diluent is used so that the particles when subsequently compounded are formed into one or more masses having a consistency ranging from a paste to a firm dough. The contact desirably occurs at a temperature in the range from 0° C. to 95° C., preferably 8° C. to 75° C., more preferably from 15° C. to 40° C.

The diluent may be one or more materials that are liquid at 25° C. and 1 atm. The diluent liquids may dissolve, partially dissolve, soak, or have no ability to dissolve the particles. Exemplary diluents are liquids whose molecules have polar groups preferably containing one or more hetero atoms such as N, S, and/or O. However, hydrocarbon and halogenated hydrocarbon diluents also may be used. Preferred diluents include water; alcohols such as methanol, ethanol, isopropanol; esters such as ethyl acetate and butyl acetate; ketones such as methyl ethyl ketone or cyclohexanone; tetrahydrofuran; combinations of these and the like. Water is preferred.

The polymer particles and the diluent are compounded together to form one or more homogeneous masses. Compounding preferably allows thorough and intense mixing. Useful compounding machines include, for example, granulators, kneaders, extruders, presses, or roller mills.

After compounding, the compounded material is processed into particles having desired size(s) though any suitable comminution technique. According to one illustrative mode of practice, this occurs using dry grinding techniques or first drying and then grinding. Dry grinding can occur in a wide variety of suitable devices, including gas swept impact mills, hammer mills, screen type mills, pin mills, disk mills, jet mills, classifier mills, or the like. Drying often is accomplished by exposure to hot gas in combination with the milling energy when dry grinding. A preferred embodiment of such compounded masses is derived from ingredients including hydrophobically modified hydroxyethylcellulose (HMHEC).

Techniques for compounding water soluble polymer particles into particles are further described in WO 2012/015534A1; WO 2012/015400A1; WO 2011/046679A1; and EP 2412690A2; each of which is incorporated herein by reference in its entirety for all purposes.

Optionally, the dry-ground particles may be subjected to a further wet granulation step. The particles may be granulated using a suitable binding liquid. A number of wet-granulation processes are known in the art and may be used in the practice of the present invention. Granulation techniques are frequently categorized by the magnitude of the shear forces that are exerted on the particles being granulated or further granulated. Low shear granulation is often accomplished using mixing devices such as planetary mixers. In these, vertical mixing blades rotate through the particles at relatively slow speed. Medium shear granulation is often accomplished in equipment in which the particles are confined in a cylindrical shell. Ribbon-shaped blades agitate the particles in the presence of granulating liquid(s), which may or may not contain a binder. High shear granulation often is performed using a main agitator or impeller that applies high shear and compaction forces to the particles using "plowshare" type blades rotating at relatively high rates. High shear mixers may include secondary, independently controlled, smaller chopper blades that break up large lumps produced during the granulation process. Chopper blades also promote more uniform integration of the granulating liquid with the particles. An exemplary high shear mixer is a Lödige granulator, which includes plow share and chopper blades.

Another useful wet-granulation process is fluid bed granulation, also called fluidized bed granulation. In this process, a binding liquid is sprayed into or on a bed of fluidized powder. The binding liquid may be atomized. The particles are fluidized in any suitable manners, such as by gas flowing through an array of orifices in a distribution plate.

After dry-grinding and optional wet granulation processing (if any), the particles preferably have a median particle length of at least 50 micrometers, more preferably at least 60 micrometers, and most preferably at least 70 micrometers. The particles preferably have a median particle length of up to 2000 micrometers, more preferably up to 1500 micrometers, and most preferably up to 900 micrometers. The length of the particle is defined as the longest direct distance between opposite ends of the particle inside the particle contour, designated as LOP (Length of Particle). "Direct" means without loops or branches. The LOP preferably is measured by a high speed image analysis system which combines particle size and shape analysis.

The LOP (50,3) is the median length of particle and is defined as follows. All particle size distributions, e.g. the LOP, can be displayed and applied as a number (0), length (1), area (2) or volume (3) distribution. Preferably the volume distribution of the LOP is calculated as cumulative distribution Q3. The volume distribution within the particle length value LOP (50,3) is designated by the number 3 after the comma to indicate a volume distribution. The designation 50, reflecting the median value, stands for 50% of the length of particle distribution being smaller than the given value (often expressed in μm) and 50% being larger. The 50% LOP (50,3) value is calculated by the image analyzer software. A high speed image analysis system is commercially available from Sympatec GmbH, Clausthal Zellerfeld, Germany as dynamic image analysis (DIA) system QICPIC™. The system analyzes the shape of the particles and takes potential curliness of the particles into account. It provides a more accurate measurement of true particle sizes than other methods. The dynamic image analysis (DIA) system QICPIC™ is described in more detail by Witt, W., Kohler, U., List, J.: Direct Imaging of Very Fast Particles Opens the Application of Powerful (dry) Dispersion for Size and Shape Characterization, PARTEC 2004, Nuremberg, Germany.

Optionally, the water-effusing particles may be further processed to separate, grade, or classify, the particles into separate groupings with more uniform particle sizes. Sieving through screens is one suitable way to accomplish size grading. For instance, particles may be sieved to provide one population of particles in which at least 80%, preferably at least 90%, more preferably at least 95% by weight of the particles have a LOP (50,3) size in the range from 600 micrometers to 850 micrometers. The following graded size ranges would be a useful inventory of size-graded particles for tailoring the release profile of particles in aqueous cementing compositions: 180 um to 300 um, 300 um to 600 um, 600 um to 850 um, 850 um to 1.18 mm, 1.18 mm to 1.7 mm, and 1.7 mm to 2 mm.

The amount of particles incorporated into the aqueous cementing compositions may vary over a wide range. In many illustrative embodiments, the particles are present in an amount of from 0.01% bwoc to 3% bwoc. Preferably, the particles are present in an amount of from equal to or greater than 0.01% bwoc, preferably equal to or greater than 0.05% bwoc, more preferably equal to or greater than 0.1% bwoc, and even more preferably equal to or greater than 0.2% bwoc. Preferably the particles are present in an amount of from equal to or less than 3% bwoc, preferably equal to or less than 2% bwoc, and more preferably equal to or less than 1% bwoc.

In the practice of the present invention, the particles comprise aggregated, water soluble polymer particles. As used herein, water soluble with respect to a polymer means that the polymer has solubility of at least 2 grams polymer per 100 grams distilled water at 25° C. and 1 atm.

In order to provide such viscosifying characteristics, the water soluble polymers of the present invention often have a range of weight-average molecular weights (Mw) of 100,000 to 4,000,000 Daltons. Preferably the water soluble polymer has a weight average molecular weight of equal to or greater than 500,000 Daltons, preferably equal to or greater than 1,000,000 Daltons, and more preferably equal to or greater than 1,500,000 Daltons. Preferably the weight-average molecular weight is equal to or less than 4,000,000 Daltons, preferably equal to or less than 3,000,000 Daltons, and more preferably equal to or less than 2,500,000 Daltons. Examples of such Mw ranges include, but are not limited to, 100,000 to 3,000,000 Daltons; 100,000 to 2,500,000 Daltons; 500,000 to 3,000,000 Daltons; 500,000 to 2,500,000 Daltons; 1,000,000 to 2,500,000 Daltons; 1,000,000 to 3,000,000 Daltons; 1,000,000 to 4,000,000 Daltons; 1,500,000 to 2,500,000 Daltons; 1,500,000 to 3,000,000 Daltons; or 1,500,000 to 4,000,000 Daltons.

The weight average molecular weight is measured by size-exclusion chromatography (SEC). According to this technique an eluent is prepared that includes 0.05 weight percent sodium azide ($NaN_3$) and 0.75 weight percent β-cyclodextrin (β-CD, purchased from Sigma-Aldrich) dissolved in deionized (DI) water. All eluent compositions are prepared by dissolving $NaN_3$ and β-CD in DI water that has been filtered through a 0.2 μm nylon cartridge. The mobile phase is filtered through a 0.2 μm nylon membrane prior to use.

Sample solutions are prepared in the mobile phase to minimize interference from any salt peak. The target sample concentration is about 0.3 mg/mL in order to be sufficiently below C*, the intermolecular polymer chain overlap concentration. Solutions are slowly shaken on a flat bed shaker for 2-3 hours to dissolve the samples, and then are stored overnight in a refrigerator set at 4° C. for complete hydration and dissolution. On the second day, solutions are shaken again for 1-2 hours. All solutions are filtered through a 0.45 μm nylon syringe filter prior to injection. The following parameters have been found to be useful:

Pump, a Waters 2690 pump is set at 0.5 mL/min flow rate and equipped with a filter that consists of two layers of 0.2 μm nylon membrane installed upstream of the injection valve.

Injection: Waters 2690 programmed to inject 100 microliters of solution.

Columns: Two TSK-GEL GMPW columns (7.5 mm ID×30 cm, 17 μm particles, 100 Å to 1000 Å pores nominal) are operated at 30° C.

Detector: A Waters DRI detector 2410 is operated at 30° C.

The conventional SEC calibration is determined using 11 narrow polyethylene oxide (PEO) standards (linear, narrow molecular weight PEO standards are purchased from TOSOH, Montgomeryville, Pa.). The calibration curve is fit to a first order polynomial over the range of 879 kg/mol to 1.47 kg/mol. Data is acquired and reduced using Cirrus SEC software version 2.0.

A wide range of water soluble polymers may be used singly or in combination to prepare the particles. Exemplary water soluble polymers include polysaccharides, poly(meth)acrylates, poly(meth)acrylamides, polyvinyl alcohols, poly (meth)acrylate cellulose, gums, biopolymers, polymerized fatty acids, polyglycols, polyalkylene oxides, polyglycerols, esters, polyanionic lignin, copolymers of these, combinations of these, and the like. The water soluble polymers may be thermoplastic and/or thermosetting. Preferably, the water soluble polymer(s) are thermoplastic. If thermosetting, the polymer may be water soluble prior to thermoset curing but may be water insoluble after thermoset curing. Thermosetting polymers are deemed to be water soluble herein if the polymer is water soluble prior to thermoset curing.

Water soluble polymers in the form of one or more polysaccharides or derivatives thereof are preferred. Considering that the repeating units in a typical polysaccharide or polysaccharide derivative backbone often include six-carbon monosaccharides, the general formula for a polysaccharide may be represented as $(C_6H_{10}O_5)_n$, where in many illustrative embodiments $40 \leq n \leq 6000$. Water soluble polysaccharides and derivatives thereof may be storage or structural polysaccharides, but preferably are structural. Storage polysaccharides and their derivatives include starches, glycogen, and/or derivatives of these. Structural polysaccharides include cellulose, chitin, and derivatives of these.

Preferred polysaccharide derivatives are polysaccharide ethers and/or polysaccharide esters, more preferably cellulose ethers and/or esters, most preferably water-soluble cellulose ethers. The polysaccharide derivatives can have one or more substituents. Exemplary substituents include one or more of hydroxyethyl, hydroxypropyl, hydroxybutyl, methyl, ethyl, propyl, dihydroxypropyl, carboxymethyl, sulfoethyl, hydrophobic long-chain branched and unbranched alkyl groups, hydrophobic long-chain branched and unbranched alkyl aryl groups or aryl alkyl groups, cationic groups, acetate, propionate, butyrate, lactate, nitrate or sulfate. Some of these groups, e.g., hydroxyethyl, hydroxypropyl, hydroxybutyl, dihydroxypropyl and lactate, are capable of providing sites for forming grafts. The substituents of the polysaccharides according to the invention are not limited to these groups. Typical polysaccharide derivatives are guar derivatives, starch derivatives, chitin or chitosan derivatives, and preferably cellulose derivatives, but the polysaccharide derivatives according to the invention are not limited to these.

Examples of cellulose derivatives are hydroxyethyl cellulose (HEC), hydroxypropyl cellulose (HPC), ethyl hydroxyethyl cellulose (EHEC), carboxymethyl hydroxyethyl cellulose (CMHEC), hydroxypropyl hydroxyethyl cellulose (HPHEC), methyl cellulose (MC), methyl hydroxypropyl cellulose (MHPC), methyl hydroxyethyl cellulose (MHEC), carboxymethyl cellulose (CMC), hydroxypropyl methylcellulose acetate succinate, hydrophobically modified hydroxyethyl cellulose (HMHEC), hydrophobically modified hydroxypropyl cellulose (HMHPC), hydrophobically modified ethyl hydroxyethyl cellulose (HMEHEC), hydrophobically modified carboxymethyl hydroxyethyl cellulose (HMCMHEC), hydrophobically modified hydroxypropyl hydroxyethyl cellulose (HMHPHEC), hydrophobically modified methyl cellulose (HMMC), hydrophobically modified methyl hydroxypropyl cellulose (HMMHPC), hydrophobically modified methyl hydroxyethyl cellulose (HMMHEC), hydrophobically modified carboxymethyl methyl cellulose (HMHMCMMC), sulfoethyl cellulose (SEC), hydroxyethyl sulfoethyl cellulose (HESEC), hydroxypropyl sulfoethyl cellulose (HPSEC), methyl hydroxyethyl sulfoethylcellulose (MHESEC), methyl hydroxypropyl sulfoethyl cellulose (MHPSEC), hydroxyethyl hydroxypropyl sulfoethyl cellulose (HEHPSEC), carboxymethyl sulfoethyl cellulose (CMSEC), hydrophobically modified sulfoethyl cellulose (HMSEC), hydrophobically modified hydroxyethyl sulfoethyl cellulose (HMHESEC), hydrophobically modified hydroxypropyl sulfoethyl cellulose (HMHPSEC) or hydrophobically modified hydroxyethyl hydroxypropyl sulfoethyl cellulose (HMHEHPSEC).

The production of polysaccharide derivatives, preferably polysaccharide ethers and polysaccharide esters is known in the art. Typically the production process involves activating the polysaccharide, such as cellulose, for example by treatment with an alkali metal hydroxide, reacting the thus treated polysaccharide with a derivatizing agent, such as an etherifying or esterifying agent, and washing the polysaccharide derivative to remove byproducts. After the washing step the polysaccharide derivative generally has a moisture content of from 30 to 60 percent, typically from 45 to 55 percent, based on the total weight of the moist polysaccharide derivative. While the preferred washing liquor may depend on the specific type of polysaccharide derivative, preferred washing liquors generally are water, isopropanol, acetone, methylethylketone or brine. More preferred washing liquors generally are water or brine. Cellulose derivatives are generally washed at a temperature of from 20 to 120° C., preferably from 65 to 95° C. A solvent-moist, preferably a water-moist filter cake is obtained after washing and separating the polysaccharide derivative from the washing liquor. The moist polysaccharide derivative is usually obtained in the shape of moist particles, moist lumps and/or a moist paste.

The cellulose derivatives rank among the industrially important polysaccharide derivatives. Their preparation, properties and applications are further described, for example, in *Ullmann's Encyclopedia of Industrial Chemistry*, 5th Edition, (1986), Volume A5, pages 461-488, VCH Verlagsgesellschaft, Weinheim or in "*Methoden der organischen Chemie*" (methods of organic chemistry), 4th Edition (1987), Volume E20, *Makromolekulare Stoffe*, Part Volume 3, pages 2048-2076, Georg Thieme Verlag, Stuttgart.

In some embodiments, the cellulose ether is hydroxyethylcellulose (HEC) hydroxypropylmethylcellulose (HPMC), methylcellulose (MC), hydrophobically modified derivatives of one or more of these, and combinations thereof. HPMC and/or MC are available under the METHOCEL trademark from The Dow Chemical Company, Midland, Mich. The hydroxypropylmethylcellulose may be a high-hydroxypropyl cellulose ether or a low-hydroxypropyl cellulose ether. As used herein, a "high-hydroxypropyl cellulose ether" is a hydroxypropylmethylcellulose having 28-30% by weight methoxyl groups and 7.0-12.0% by weight hydroxypropoxyl groups. A non-limiting example of a high-hydroxypropyl cellulose ether is Hypromellose 2910 available from The Dow Chemical Company, Midland, Mich. under the trademark METHOCEL E. A "low-hydroxypropyl cellulose ether" is a hydroxypropylmethylcellulose having 27-30% by weight methoxyl groups and 4.0-7.5% by weight hydroxypropxyl groups. A non-limiting example of a low-hydroxypropyl cellulose ether is Hypromellose 2906 available from The Dow Chemical Company, Midland, Mich. under the trademark METHOCEL F. Another useful nonionic, higher molecular weight cellulose ether is available under the HEC 10 trade designation from sources including Canamara United Supply, Edmonton, Canada, QMax Solutions, Inc., Calgary, Canada.

Additional, non-limiting examples of suitable HPMC and MC available under the METHOCEL™ trade designation are set forth in Table 1 below: In the table below, "hypromellose" is a nickname for hydroxypropylcellulose.

TABLE 1

| METHOCEL™ Product | Chemical Type | Methoxyl Content, % | Hydroxy-propyl Content, % | Viscosity of 2% solution in water, mPa·s |
|---|---|---|---|---|
| METHOCEL™ A15 Premium LV | Methylcellulose, USP | 27.5-31.5 | 0 | 12-18 |
| METHOCEL™ E3 Premium LV | Hypromellose 2910 | 28-30 | 7-12 | 2.4-3.6 |
| METHOCEL™ E5 Premium LV | Hypromellose 2910 | 28-30 | 7-12 | 4-6 |
| METHOCEL™ E6 Premium LV | Hypromellose 2910 | 28-30 | 7-12 | 5-7 |
| METHOCEL™ E15 Premium LV | Hypromellose 2910 | 28-30 | 7-12 | 12-18 |
| METHOCEL™ E50 Premium LV | Hypromellose 2910 | 28-30 | 7-12 | 40-60 |
| METHOCEL™ F50 Premium | Hypromellose 2906 | 27-30 | 4-7.5 | 40-60 |
| METHOCEL™ K3 Premium LV | Hypromellose 2208 | 19-24 | 7-12 | 2.4-3.6 |
| METHOCEL™ K100 Premium LV | Hypromellose 2208 | 19-24 | 7-12 | 80-120 |

In many preferred embodiments, at least one of the water soluble polymer(s) used to form the water-effusing particles is a hydrophobically-modified polymer. Advantageously, hydrophobically modified, water soluble polymers provide enhance viscosity build for water-based compositions. Without wishing to be bound, it is believed that the hydrophobic segments interact or otherwise associate in aqueous media. This increases the effective molecular weight of the associated polymers for enhanced viscosity build but without unduly undermining the compatibility of the polymers with water.

As used herein, the term "hydrophobically-modified" with respect to a polymer means that a polymer is modified to incorporate one or more different kinds of hydrophobic substituents. These may be pendant directly from the polymer backbone or may be incorporated onto side chains. The hydrodrophobically modified polymer still may be water soluble, due at least in part to the presence of the hydrophilic polymer backbone. The hydrophobic substituent preferably is non-ionic.

Representative embodiments of suitable hydrophobic substituents include acyclic and/or cyclic, saturated or unsaturated, branched or linear hydrocarbon groups. Hydrocarbyl groups include alkyl, alkylaryl and/or arylalkyl groups having at least 8 carbon atoms, generally from 8 to 32 carbon atoms, preferably from 10 to 30 carbon atoms, more preferably from 12 to 24 carbon atoms, and most preferably from 12 to 18 carbon atoms. As used herein the terms "arylalkyl group" and "alkylaryl group" mean groups containing both aromatic and aliphatic structures. Optionally, a hydrophobic moiety may include one or more heteroatoms wherein the ratio of C atoms to heteroatom(s) is preferably at least 5:1, more preferably at least 8:1, to preserve the hydrophobic character of the moiety. An example of a hydrophobic substituent including O as a hetero atom is dodecylphenyl glycidyl ether. The most preferred aliphatic hydrophobic substituent is a hexadecyl group, preferably a linear hexadecyl group. A specific example of a suitable hydrophobically modified cellulose ether suitable in the practice of the present invention is commercially available under the EMBARK Rheology Modifier 160 trade designation from The Dow Chemical Company.

The average number of moles of the hydrophobic substituent(s) per mole of water soluble polymer to be hydrophobically modified is designated as "hydrophobe DS" (hydrophobe degree of substitution). The hydrophobe DS is generally equal to or greater than 0.001, preferably equal to or greater than 0.0018, more preferably equal to or greater than 0.0027, and even more preferably equal to or greater than 0.0058 mole of the hydrophobic substituent(s), per mole of anhydroglucose unit. The average substitution level of the hydrophobic substituent(s) is equal to or less than 0.025, preferably equal to or less than 0.018, more preferably equal to or less than 0.015, and even more preferably equal to or less than 0.012 mole of the hydrophobic substituent(s), per mole of anhydroglucose unit. Examples of such ranges include, but are not limited to, 0.001 to 0.012; 0.001 to 0.015; 0.001 to 0.018; 0.001 to 0.025; 0.0018 to 0.012; 0.0018 to 0.015; 0.0018 to 0.018; 0.0018 to 0.025; 0.0027 to 0.012; 0.0027 to 0.015; 0.0027 to 0.018; 0.0027 to 0.025; and 0.0058 to 0.012; 0.0058 to 0.015; 0.0058 to 0.018; 0.0058 to 0.025.

The hydrophobe DS is measured using the Morgan modification of the Zeisel method as described in P. W. Morgan, Ind. Eng. Chem., Anal. Ed., 18, 500-504 (1946). The procedure is also described in ASTM method D-2364, but using a gas chromatograph to measure the concentration of cleaved alkyl groups. In the case of alkylaryl hydrophobes such as dodecylphenyl glycidyl ether, the spectrophotometric method described in U.S. Pat. No. 6,372,901 can be used to determine the hydrophobe DS. With increasing hydrophobe substitution, a point is reached at which the resulting polymer is water-insoluble. However, if the point of water-insolubility due to hydrophobe substitution is exceeded, further modification of the polymer with ionic functionality such as cationic or anionic groups can render the polymer soluble in water ("re-solubilize" the polymer) without adversely affecting the desired elevated temperature rheology and reduction in thermal thinning behavior. This upper limit varies depending on the specific hydrophobe used, the molecular weight of the cellulosic backbone, and the method in which the hydrophobe is added. More than one type of hydrophobic substituent can be substituted onto the cellulose ether, but the total substitution level is preferably within the ranges set forth above.

In addition to hydrophobic modification, the water soluble polymer(s) optionally may be functionalized with one or more other kinds of substituents. For example, the polymers may be anionically modified as described in Assignee's Co-Pending U.S. Provisional Patent Application having Ser. No. 61/541,001, titled Cementing Compositions Comprising Anionically- and Hydrophobically-modified Cellulose Ethers and Its Use, having filed Sep. 29, 2011, in the name of Dow Global Technologies LLC. Methods of making the modified polymers also are described in this co-pending application, which is incorporated by reference herein in its entirety for all purposes.

Optionally, the aqueous cementing compositions of the present invention may include one or more additional ingredients conventionally added to cement compositions, particularly cement compositions useful in cementing casings in the borehole of a well in the amounts normally used. Examples include one or more of other polymers optionally incorporated into the same or different particles as the water soluble polymer(s); nonhydraulic cement(s); light-weight additives, such as bentonite, diatomaceous earth, coal, perlite, vermiculite, and pozzolan; heavy-weight additives, such as hematite, slag, recycled concrete, ilmenite, barite, silica flour, and sand; dispersants; tensile reinforcement (rebar, fiberglass, nylon, polyethylene, polypropylene, ceramics, etc.); cement accelerators, such as calcium chloride, sodium chloride, gypsum, sodium silicate and sea water; cement retarders, such as lignins, sodium or calcium lignosulfonates, CMHEC (carboxymethylhydroxyethylcellulose ether) and sodium chloride; additives for controlling lost circulation, such as gilsonite, walnut hulls, cellophane flakes, gypsum cement, bentonite-diesel oil and fibers; filtration control additives, such as cellulose dispersants, CMHEC and latex; antifoaming agents, such as FP-L6 from BJ Services Company; surfactants; formation conditioning agents; and expanding additives.

The term "dispersant" encompasses any nonionic or ionic molecule that contains both a hydrophobic (for example, any hydrocarbon substituent, such as alkyl, aryl or alkaryl group) portion and a hydrophilic (for example, any negatively-charged moiety, such as O—, $CO_2$—, $SO_3$—, and/or $OSO_3$—) portion. Preferred dispersants are anionic. The term dispersant also includes those chemicals that function as a plasticizer, high range water reducer, fluidizer, antiflocculating agent, or superplasticizer for cement compositions. Examples of suitable dispersants are lignosulfonates, beta naphthalene sulfonates, sulfonated melamine formaldehyde condensates, polyaspartates, or naphthalene sulfonate formaldehyde condensate resins.

Other suitable dispersants are branched and non-branched polycarboxylate polymers. Polycarboxylate polymers (referred to also as polyacrylate polymers) are polymers having a carbon backbone with pendant side chains, wherein at least a portion of the side chains are attached to the backbone through a carboxyl group or an ether group. Examples of polycarboxylate dispersants can be found in U.S. Pat. No. 7,815,731 (and patents incorporated therein) which is incorporated by reference herein in its entirety.

In some modes of practice, preferable dispersants are sulfonic acid derivatives of aromatic or aliphatic hydrocarbons, such as naphthalene sulfonic acid formaldehyde condensation product derivatives, such as their sodium or potassium salts. Particularly preferred are polynaphthalene sulfonate resins (or salts thereof), including those with a narrow molecular weight distribution and sodium or potassium naphthalene sulfonate formaldehyde condensation products. Examples include sulfonated melamine formaldehyde condensates, melamine formaldehyde condensates, sulfonated naphthalene formaldehyde condensates, sodium or potassium salts of a sulfonated naphthalene formaldehyde condensates, polynaphthalene sulfonates, sulfonated polyacrylamides, sulfonated styrene/maleic anhydride copolymers, see U.S. Pat. No. 7,422,061 which is incorporated herein in its entirety for all purposes.

In other modes of practice, a preferred dispersing agent is a water soluble polymer prepared by the caustic catalyzed condensation of a ketone, an aldehyde and sodium sulfite. A preferred dispersing agent is commercially available from Halliburton under the trade designation CFR-3™, see U.S. Pat. No. 5,779,787 which is incorporated by reference herein in its entirety. Other preferred dispersants that can be used include polynaphthalene sulfonates available from Dow Chemical Company, such as "TIC I"; calcium lignosulfonates; sodium naphthalene sulfonate formaldehyde condensation products, such as DAXAD™ 19 and DAXAD 11 KLS both of W. R. Grace Company, LOMAR™ D of Geo Specialty Chemicals, D 31 of BJ Services Company, D 65 of Dowell Company, and LIQUIMENT™ of BASF.

The dispersant often is present in an amount of from 0.01% bwoc to 3% bwoc. The dispersant is present in an amount equal to or greater than 0.01% bwoc, preferably equal to or greater than 0.05% bwoc, more preferably equal to or greater than 0.1% bwoc, more preferably equal to or greater than 0.5% bwoc, and even more preferably equal to or greater than 0.7% bwoc. The dispersant is present in an amount equal to or less than 3% bwoc, preferably equal to or less than 2% bwoc, more preferably equal to or less than 1.5% bwoc, and even more preferably equal to or less than 1% bwoc.

The aqueous cementing compositions of the present invention may be prepared according to conventional means as are well known in the art. Often, the slurries include water, one or more hydraulic cement(s), at least one hydrophobically-modified, water soluble polymer, and at least one dispersant. One or more of the cement, hydrophobically-modified polymer, and dispersant may be pre-mixed and added together or these may be added separately in any order to the slurry. For example, they may be added to the cement by dry mixing and then added to the water or alternatively, by a continuous process where the additives and water are concurrently added to the cement. Alternatively, the one or more additives may be pre-mixed with the cement then mixed with the water, then one or more of the additives added directly to the slurry. In some embodiments, it is contemplated that the water-effusing particles and dispersant may be provided to the cement slurry independently, i.e., not in blended form.

In a preferred embodiment, the aqueous cementing composition of the present invention is made by dry blending at least one hydraulic cement, the particles, at least one dispersant, and optionally one or more other additives to form a dry blend cementing composition. The dry blend is then combined with an aqueous liquid carrier and mixed prior to pumping down the borehole. In some modes of practice, the dry blend cementing composition is added directly to the aqueous liquid carrier as it is being pumped down the borehole. Preferably, the dispersant is added to the water or the slurry prior to the addition of the particles. This is most readily achieved by adding water and dispersant prior to adding to the cement and other solids. Alternatively, the solids (except for the particles) may be dry mixed, added to the water (or water added to them), combined with the particles, and then mixed further to form an aqueous cementing composition of the present invention.

One embodiment of the present invention is a method to reinforce a borehole of an oil or gas well with the aqueous cementing composition of the present invention. After a borehole of an oil or gas well is drilled, a casing is run into the well. The casing is reinforced and cemented in place by filling the annulus between the borehole wall and the outside of the casing with the cementing composition of the present invention. The cement composition then is permitted to set. The resulting cement provides a sheath surrounding the casing that prevents, or inhibits, communication between the various formations penetrated by the well. In addition to isolating oil, gas and water-producing zones, the cement also aids in (1) bonding and supporting the casing, (2) protecting the casing from corrosion, (3) preventing blowouts by quickly forming a seal, (4) protecting the casing from shock loads in drilling deeper and (5) sealing off zones of lost circulation. The usual method of cementing a well is to pump the aqueous cementing composition downwardly through the casing, outwardly through the lower end of the casing and then upwardly into the annulus surrounding the casing. The upward displacement of the aqueous cementing composition through the annulus can continue until some of the aqueous cementing composition returns to the well surface, but in any event will continue past the formations to be isolated.

For example, a preferred method of the present invention is cementing a casing in a borehole of a well comprising suspending the casing in the borehole, pumping downwardly into said casing an aqueous cementing composition comprising (a) water, (b) a cementing composition of the present invention (comprising (i) at least one hydraulic cement, (ii) water-effusing particles of the present invention, (iii) at least one dispersant, (iv) an aqueous liquid carrier, and optionally (v) one or more other additives useful in cementing casings in the borehole of wells, then pumping said aqueous cementing composition upwardly into the annulus surrounding said casing, continuing said pumping until said aqueous composition fills that portion of the annular space desired to be sealed and then maintaining said aqueous cementing composition in place until the cement sets.

The cementing compositions of the present invention are characterized by little or no fluid loss at 250° F., the presence of little or no measurable free water, a viscosity designed for optimum particle suspension, optimum pumpability, especially at elevated wellbore temperature (i.e., at or above 190° F. or preferably at or above 250° F.), flow properties sufficient to facilitate and maintain laminar and/or plug flow, adequate gel strength to provide thixotropic properties to the slurry when pumping ceases.

The aqueous cementing compositions of the present invention are generally prepared to have a density of from about 5 to about 30 pounds per gallon.

For acceptable pumpability, the aqueous cementing compositions of the present invention preferably have a plastic viscosity (PV) at use temperatures, e.g., 60° F. to 90° F., preferably determined at 80° F., of from 50 to 300 as determined using a Fann Viscometer.

For adequate performance in the borehole, the aqueous cementing compositions of the present invention preferably have a 190° F. conditioned yield point (YP) as determined using a Fann Viscometer of between 10 and 100. If the YP is too low, the aqueous cementing composition is too thin and phase separation and/or fluid loss may occur. If the YP is too high, the aqueous cementing composition may generate too high of pumping pressures and/or fail to properly conform and adhere to uneven surfaces of the well bore.

Preferably, the aqueous cementing compositions have a free fluid loss at 190° F. as determined by examination of the slurry in a volumetric flask of less than 2 percent, more preferably a nondetectable loss.

Preferably, the aqueous cementing compositions have a fluid loss at 250° F. of equal to or less than 150 mL/30 minutes, more preferably equal to or less than 100 mL/30 minutes when measured as described in *Recommended Practice for Testing Well Cements*, API Recommended Practice 10B-2, 23rd Edition (2002).

The present invention will now be further described with reference to the following illustrative examples.

EXAMPLE 1

The following procedure exemplifies a standard procedure for making a hydrophobically modified polymer, (aqueous) cementing compositions, and measuring the resulting compound performance properties related to viscosity and fluid loss. In addition, one skilled in the art will appreciate that this is an exemplary procedure and that other components can be substituted or removed in the procedure to make a similar cementing composition.

The following materials are used: Deionized water; Sodium hydroxide (Pellets/Certified ACS, Fisher Scientific); CELLOSIZE™ HEC QP-52,000H hydroxyethyl cellulose (The Dow Chemical Company); Isopropyl alcohol (reagent grade, VWR); Nitrogen (Ultra High Purity Grade, Airgas); 1-Bromohexadecane (n-$C_{16}H_{33}$Br, Sigma-Aldrich); Glacial acetic acid (99.99 percent, Sigma-Aldrich); Acetone (Certified ACS, Fisher Scientific); Aqueous glyoxal (40 weight percent in $H_2O$, Sigma-Aldrich); Sodium azide ($NaN_3$, Sigma-Aldrich).

"Polymer 1" is a hydrophobically-modified hydroxyethyl cellulose prepared by the following method: A 3000 mL three-necked round bottomed flask is fitted with a mechanical stirring paddle, a nitrogen inlet, a rubber serum cap, and a reflux condenser connected to a mineral oil bubbler. The resin kettle is charged with 199.94 g (184.46 g contained) of CELLOSIZE HEC QP-52,000H hydroxyethyl cellulose, 1056 g of isopropyl alcohol, and 144 g of deionized water. While stirring the mixture, the resin kettle is purged with nitrogen for one hour to remove any entrained oxygen in the system. While stirring under nitrogen, 24.79 g of 50 weight percent aqueous sodium hydroxide solution are added dropwise over five minutes using a syringe. The mixture is allowed to stir for 30 minutes under nitrogen.

The mixture is heated to reflux with stirring under nitrogen. At reflux, 22.53 g of 1-bromohexadecane are slowly added over 5 minutes. The mixture is held at reflux for 4.5 hours with stirring under nitrogen. The mixture is cooled to room temperature and neutralized by adding 31.0 g of glacial acetic acid and stirred for 10 minutes. The polymer is recovered by vacuum filtration and washed in a Waring blender: four times with 1500 mL of 4:1 (by volume) of acetone/water and twice with 1500 mL of pure acetone. The polymer is treated by adding 2.5 g of 40 percent aqueous glyoxal and 1.5 g of glacial acetic acid to the last acetone desiccation. The polymer is dried in vacuo at 50° C. overnight, yielding 192.81 g of an off-white powder with a volatiles content of 6.00 weight percent and an ash content (as sodium acetate) of 2.58 weight percent. The polymer $M_w$ is found to be about 1,400,000 Daltons and the hydrophobe degree of substitution (DS) (by Zeisel analysis) is found to be 0.0058.

To prepare water effusing granules ("Compounded Particles) of the present invention, Polymer 1 is compounded and then dry ground to size using techniques described above for forming particles believed to incorporate gel matrices. The dry ground particles are sieve-graded to prepare particle populations with uniform sizes in a desired size range. The graded particles have a particle size of 600 micrometers to 850 micrometers.

EXAMPLE 2

Using Polymer 1 or Compounded Particles, cementing compositions (Samples 1-7) are prepared according to API RP 10A: The following materials are used in making the cementing compositions used to make the samples: 630 grams (g) of Class H, Texas Lehigh Portland cement, 35% bwoc silica sand, Polymer 1 or Compounded Particles as the case may be, optional dispersant available as LIQUIMENT from BASF, 0.01% bwoc of an alcohol based antifoaming compound FP-6L available from BJ Services Company, and 0.7% bwoc of a sodium lignosulfonate retarder KELIG™ 32 available from Borregaard LignoTech. The type of polymer or particles, amount of dispersant, and properties are listed in Table 2 below, in which amounts are given in weight percent based on the weight of the cement (% bwoc).

The powders are dry mixed for 15 sec at low shear (4,000 rpm) and then for 35 sec at high shear (12,000 rpm). Then 50% bwoc tap water is added to the dry mixed cementing compositions. For Examples 1 to 7, all ingredients are dry blended together prior to adding water. Then 50% bwoc tap water is added to the dry mixed cementing compositions. The compositions are then mixed for 15 sec at low shear (4,000 rpm) and then for 35 sec at high shear (2,000 rpm).

TABLE 2

| Sample | Polymer 1 (A) or Compound Particles (B) | Polymer, % bwoc | Dispersant, % bwoc | Cement, g | Water, % bwoc | Initial PV/YP @ 80° F. | Conditioned PV/YP @ 190° F. | Free Fluid @ 190° F. | Fluid Loss @ 250° F. |
|---|---|---|---|---|---|---|---|---|---|
| 1 | A | 0.2 | 0.8 | 630 | 50 | n.m. | 125/28 | trace | 74 |
| 2 | A | 0.1 | 0.9 | 630 | 50 | 112/18 | 9/5 | 2.9 | 140 |
| 3 | B | 0.5 | 0 | 630 | 50 | 224/23 | n.m. | 0 | 56 |
| 4 | B | 0.3 | 0 | 630 | 50 | 356/96 | n.m. | 0 | 122 |
| 5 | B | 0.3 | 0.7 | 630 | 50 | 230/4 | 182/3 | 0 | 74 |
| 6 | B | 0.2 | 0.8 | 630 | 50 | 136/9 | 75/6 | 0 | 44 |
| 7 | B | 0.2 | 0.8 | 630 | 50 | 62/31 | 36/31 | 0 | 72 | n.m. = not measured

Sample 1 becomes very viscous so that YP and PV are not readily measured. Sample 2 uses less polymer and more dispersant than Sample 1. The initial PV and YP are suitable, but upon heating the viscosity is too low. Also, there is too much free fluid and fluid loss. Sample 3 uses Compounded Particles without dispersant. Initial PV and YP are suitable, but the viscosity is too high upon heating. Sample 4 uses less Compounded Particles than Sample 3. Also, the particle sizes are smaller in Sample 4. This material is moderately thick initially and becomes too viscous upon heating. Samples 5 and 6 use Compounded Particles and a dispersant in combination. The PV values are stable upon heating, and the system would be able to tolerate a wider range of YP. Sample 7 is similar to Sample 6, but with less retarder. The PV is stable upon heating. Also, the YP is in a preferred range both before and after heating. The amount of retarder can be adjusted to optimize thickening time for a particular use. In many modes of practice, a sufficient amount of retarder is used so that the compositions set in a time period from 1 to 15, preferably 6 to 8 hours. Retarder is optional, but setting occurs very quickly if no retarder is used.

Figure 2:
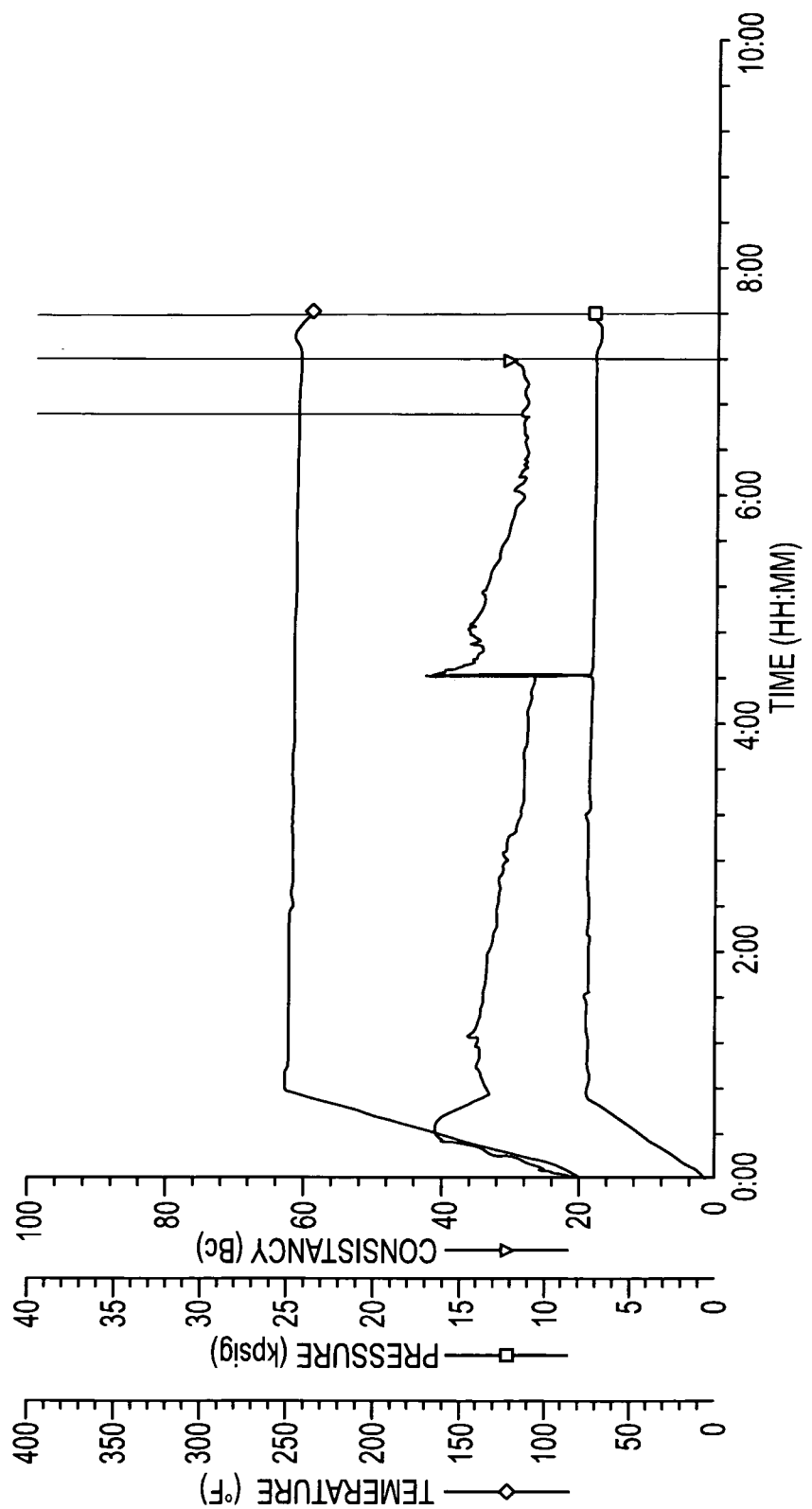
FIG. 2 is a thickening plot showing temperature, pressure, and consistency for Sample 5 as a function of time.
Figure 3:
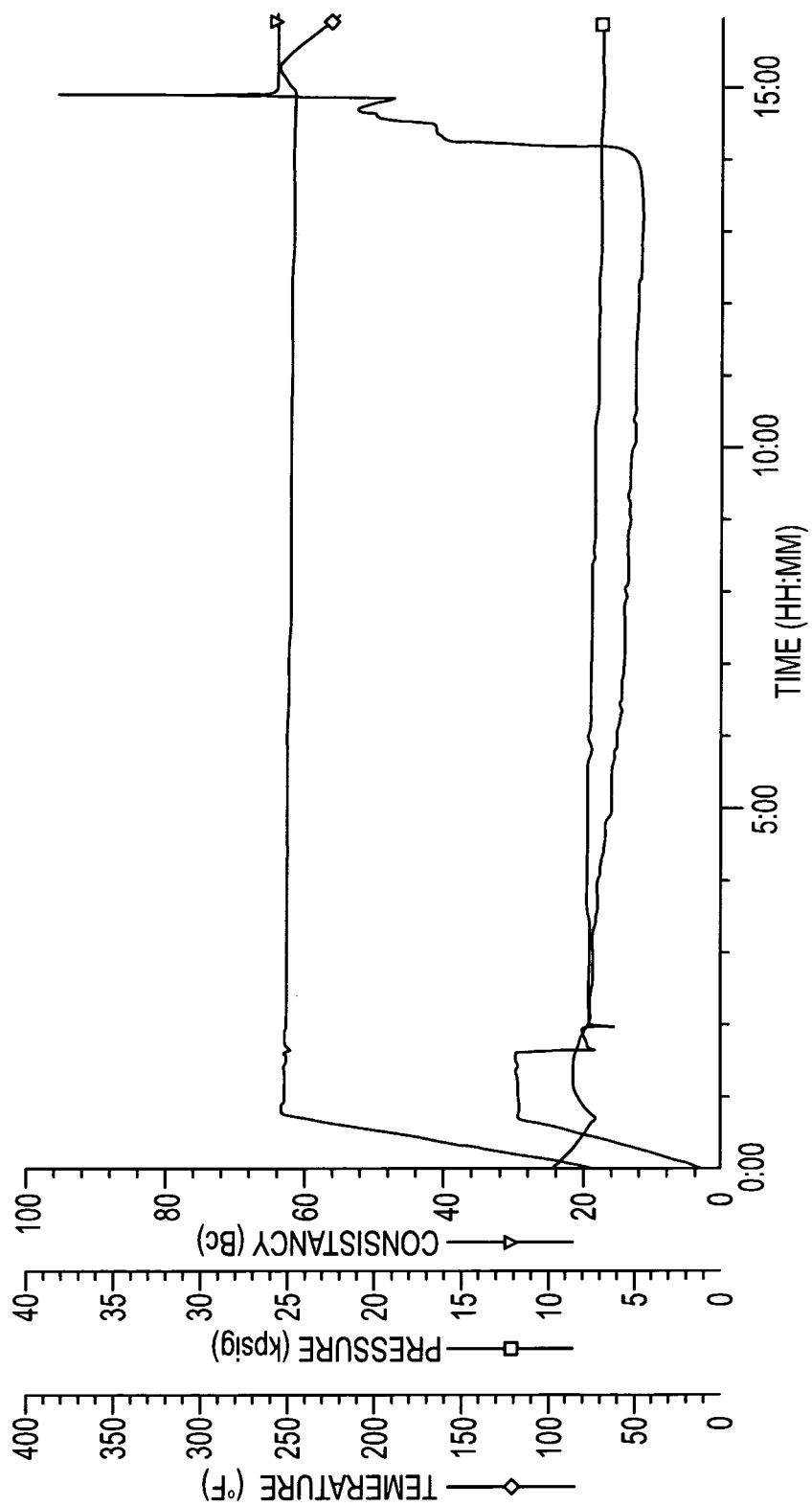
FIG. 3 is a thickening plot showing temperature, pressure, and consistency for Sample 6 as a function of time.
Figure 4:
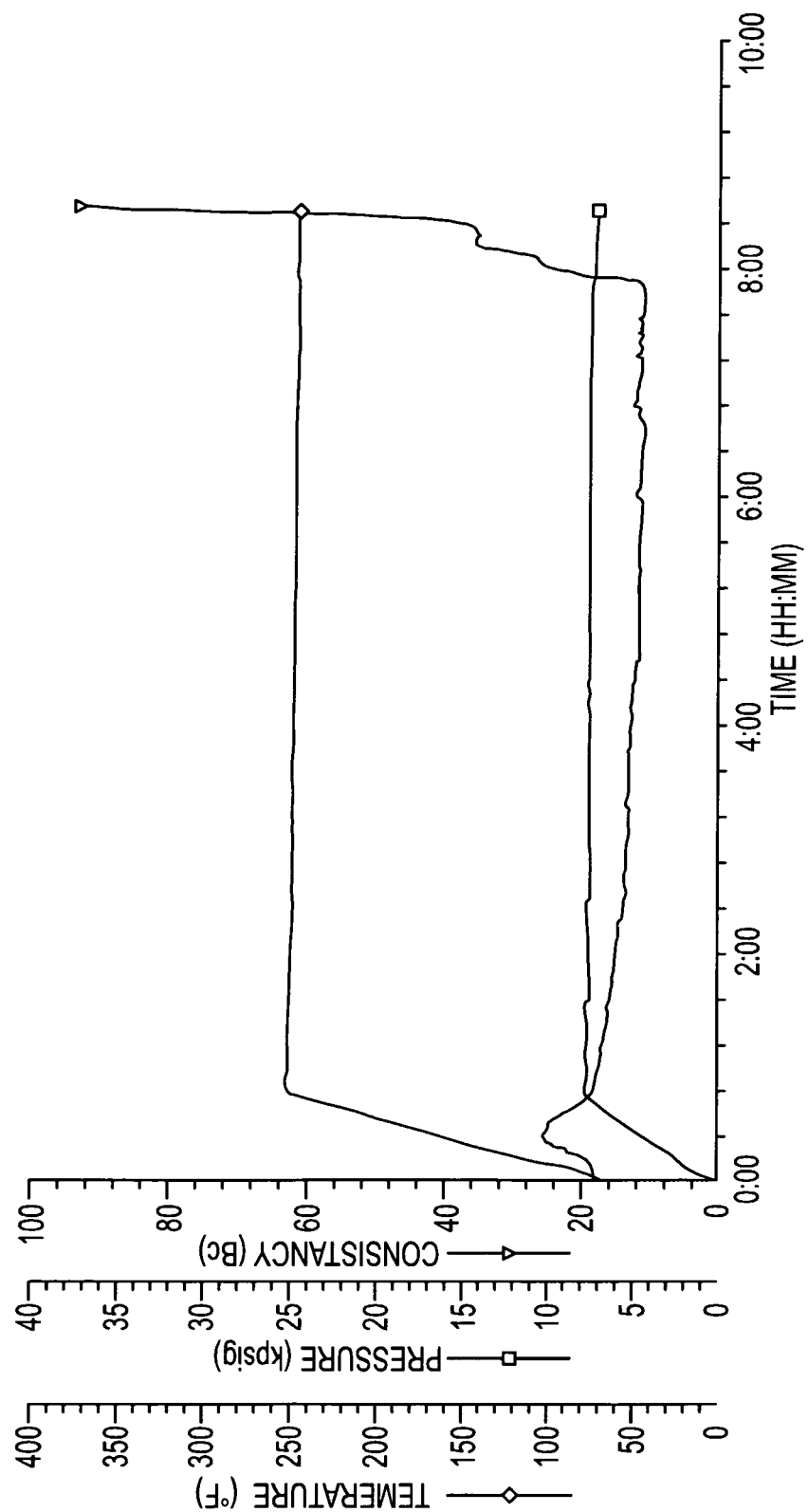
FIG. 4 is a thickening plot showing temperature, pressure, and consistency for Sample 7 as a function of time.

FIGS. 1 to 4 show thickening time charts for Samples 4 through 7, respectively. The charts indicate the thickness characteristics of a slurry under dynamic conditions, e.g., pumping conditions, over time. The test results indicate how an additive affects the thickening time of the cement as well as whether there are any major preset gelations occurring. The test results also indicate the value of the set time of a cement including the additive.

All patents, patent applications, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

The invention claimed is:

1. An aqueous cementing composition, comprising;
   (a) an aqueous liquid carrier;
   (b) an inorganic, hydraulic cement in admixture with the liquid carrier; and
   (c) a plurality of compounded, water-effusing particles dispersed in the composition, said compounded, water-effusing particles comprising reversibly agglomerated, water soluble polymer particles, said reversibly agglomerated, water soluble, polymer particles comprising at least one water soluble polymer comprising a hydrophilic polymer backbone with pendent hydrophobic groups, wherein the water-effusing particles effuse in the presence of water and an increase in temperature to release water-thickening, water soluble portions of the water-soluble polymer particles, said portions comprising the at least one water soluble polymer, wherein the rate of effusion of the water soluble portions is a function of the size of the water effusing particles, and
wherein the cementing composition has a plastic viscosity (PIO in the range of 50 to 300 when the composition is at a temperature in the range of 60° F. to 90° F.

* * * * *